United States Patent [19]

Sato et al.

[11] Patent Number: 4,797,940

[45] Date of Patent: Jan. 10, 1989

[54] OPTICAL CHARACTER READER

[75] Inventors: Koji Sato; Masahiro Kurakake; Kazuo Fujiwaki, all of Osaka, Japan

[73] Assignee: Sumitomo Electric Industries, Ltd., Osaka, Japan

[21] Appl. No.: 20,994

[22] Filed: Mar. 2, 1987

[30] Foreign Application Priority Data

Feb. 28, 1986 [JP] Japan .................................. 61-41474

[51] Int. Cl.⁴ .......................... G06K 9/22; G06K 9/34
[52] U.S. Cl. ....................................... 382/9; 235/470; 382/59; 358/280
[58] Field of Search .......................... 382/9, 59, 67, 45; 235/470, 472

[56]  References Cited

U.S. PATENT DOCUMENTS

| | | | |
|---|---|---|---|
| 3,231,860 | 1/1966 | Chatten | 382/45 |
| 3,947,817 | 3/1976 | Requa | 382/59 |
| 4,246,570 | 1/1981 | Kochert et al. | 382/59 |
| 4,562,594 | 12/1985 | Bednar et al. | 382/9 |
| 4,594,732 | 6/1986 | Tsuji | 382/9 |
| 4,654,873 | 3/1987 | Fujisawa et al. | 382/9 |

FOREIGN PATENT DOCUMENTS

| | | |
|---|---|---|
| 0033076 | 5/1981 | European Pat. Off. . |
| 0063454 | 4/1982 | European Pat. Off. . |
| 0113471 | 7/1984 | European Pat. Off. . |
| 0138445 | 4/1985 | European Pat. Off. . |
| 0080533 | 6/1988 | European Pat. Off. . |
| 1359781 | 7/1974 | United Kingdom . |

Primary Examiner—Leo H. Boudreau
Assistant Examiner—Donald J. Daley
Attorney, Agent, or Firm—Cushman, Darby & Cushman

[57]  ABSTRACT

An optical character reader having a scanner with a field of vision which can scan an entire line of print without being shifted. A one-character pick out circuit is provided to subdivide the binary information yielded by the scanning of an entire line into discrete units which correspond to single characters. The units may then be subjected to recognition processing to complete the reading process.

5 Claims, 5 Drawing Sheets

OPTICAL CHARACTER READER

BACKGROUND OF THE INVENTION

1. Field of the Invention

The present invention relates to an optical character reader for reading a character, a symbol or the like by scanning a paper with a hand-held scanner. A hand-held optical character reader is often used for a POS (point of sales) system in which pieces of information on the sales of article are collected in a supermarket, a department store or the like to control its inventory.

2. Description of the Prior Art

Such a hand-held optical character reader was disclosed in Japanese Patent Publication No. 6418/84. In that reader, an image sensor having a plurality of photoelectric conversion elements disposal thereon is first used to scan a character, a symbol or the like to recognize it. A vertical character range is then scanned to determine if at least one image element signal indicating the presence of a character portion exists in each of a predetermined number of rows. The rows are represented by binary signals that are generated by scanning appears in a prescribed sequence over a prescribed number of rows.

Before or after the detection of the vertical character range, a horizontal character range is scanned by determining whether at least one image element signal indicating the presence of a character portion exists in each of a predetermined number of columns which are represented by the binary signals generated by the scanning. Whether the scan of the horizontal range detects the presence of a particular character is determined by whether a prescribed sequence of signals is detected over a prescribed number of columns.

In this manner, characteristic data on the characters is extracted as to each row or column within the vertical and horizontal character ranges. Recognition processing is then performed responsive to the characteristic data in order to output a character recognition determination.

Since the field of vision of such prior art optical character readers can cover only one character at one time, the scanner of the reader needs to be moved horizontally, one by one, over a line of characters to read the characters. For that reason, a character will not be properly scanned and recognized if it is partially out of the field of vision of the reader during the movement of the scanner. Consequently, such prior art character readers frequently misidentify characters, or fail to detect certain characters completely.

SUMMARY OF THE INVENTION

Accordingly, it is an object of the present invention to provide a hand-held optical character reader having an image sensor whose field of vision is extensive enough in the horizontal direction to scan a full line of print. The output from the sensor is then converted into binary signals which are stored in a memory. The binary signals are then sequentially extracted from the memory in increments corresponding to a single character, and are then subjected to recognition processing.

The hand-held optical character reader of the present invention is characterized by an image sensor having a plurality of photoelectric conversion elements disposed thereon whose field of vision can cover a full line of characters. A binary signal generation circuit is further provided in which the output analog signals from the image sensor are converted into binary signals generation circuit is further provided in which the output analog signals from the image sensor are converted into binary signals corresponding to character regions and background regions, and a memory in which the output binary signals from the binary signal generation circuit are stored. A scanned position detecting means is further provided for distinguishing the boundary between the character regions and the background regions, to find out whether or nor the character is completely within the field of vision of the image sensor. If the characters are not completely within the field of vision of the sensor, the binary signals will not be sugjected to the recognition processing.

A one-character-pick-out means is further provided to distinguish the presence of each individual character element from the background region and other character elements. This is accomplished by separating the number of image elements necessary for the recognition processing of one character from the remainder of the binary image elements present in the memory. In addition, a recognition processing means is provided for recognizing the characters one by one in a terms of the discrete binary signals that are supplied by the one-character-pick-out means.

Since the field of vision of the image sensor in the present invention is so large a plurality of characters may be scanned without the necessity of manually moving the scanner over a line of print. Instead, the scanner needs only to be placed over the line of print to read it. For that reason, the speed and quality of scanning provided by the present invention is far superior to that of prior art devices.

BRIEF DESCRIPTION OF THE DRAWINGS

Other objects, features, and characteristics of the present invention, as well as the methods and operation and functions of the related elements of the structure, will become apparent upon consideration of the following description with reference to the accompanying drawings, all of which form a part of this specification, wherein like reference numerals designate corresponding parts in the various figures, in which.

DETAILED DESCRIPTION OF THE PREFERRED EMBODIMENTS OF THE INVENTION

Figure 1:
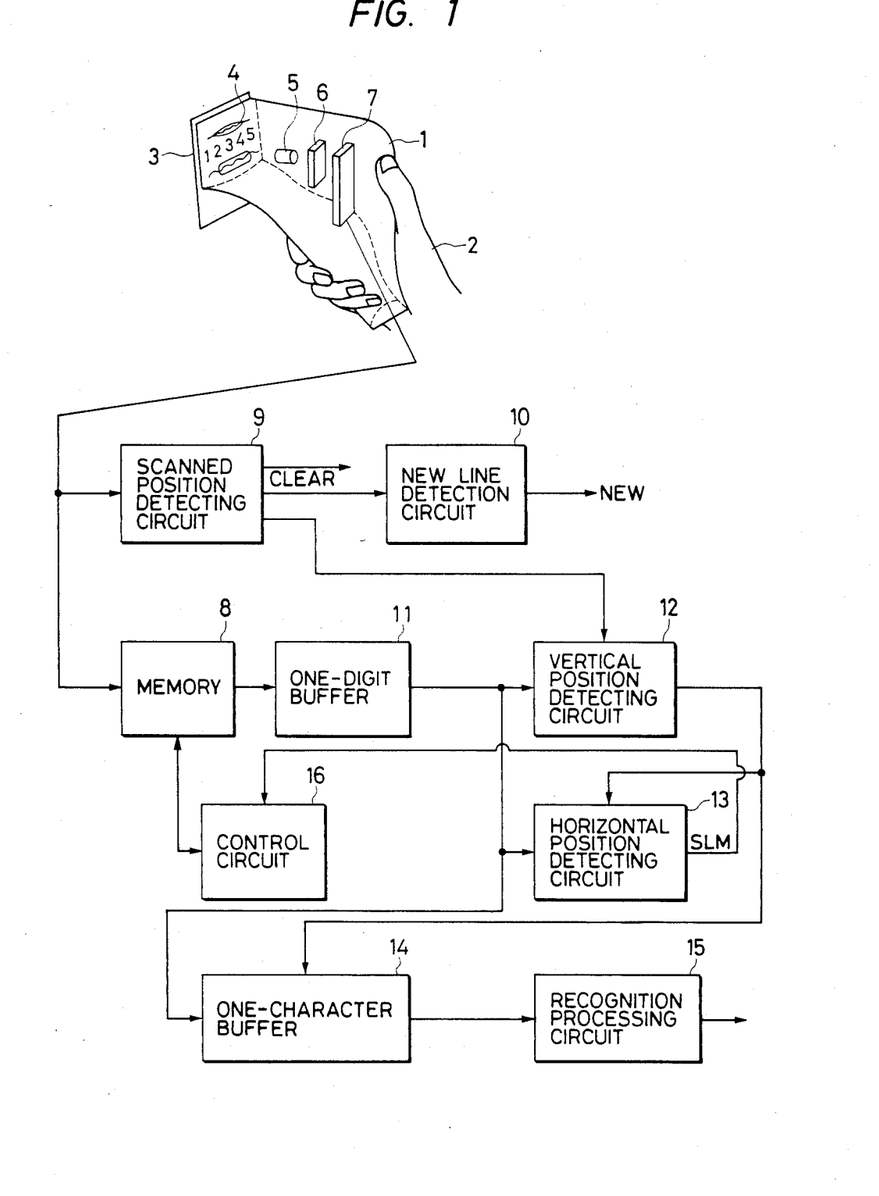
FIG. 1 shows a block diagram of a first embodiment of the present invention.

FIG. 1 shows a first embodiment of the present invention. By placing the scanner 1 over a printed sheet of paper 3, characters written on the paper can be read through the scanner. In the illustrated example, the paper 3 is a price tag on which information for a POS system is printed.

Figure 10:
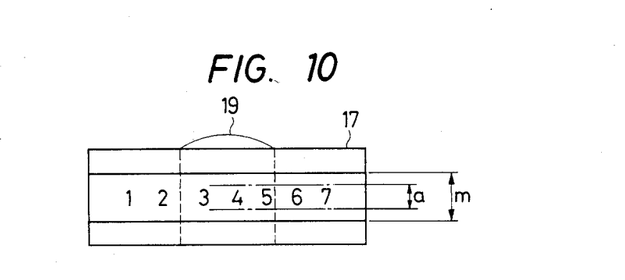
FIGS. 10 and 11 show explanatory views describing regions on which recognition processing is performed.

Shown at 4, 5 and 6 are a light source, a lens system and an image sensor, respectively. The character images are focused by the lens system on to the image sensor. The field 17 of vision of the image sensor 6 is large enough to cover at least one line of characters on the paper 3. As shown in FIG. 10, the horizontal length of the field of vision is nearly equal to that of one line of characters, while the vertical length of the field of vision in nearly three times the height of one character.

Shown at 7 is a control and binary signal generation circuit which converts the output analog signals of the image sensor 6 into binary signals corresponding to a character region and a background region, and sends the binary signals to a memory 8 in which the binary signals for the whole field of vision of the image sensor are stored.

Figure 2:
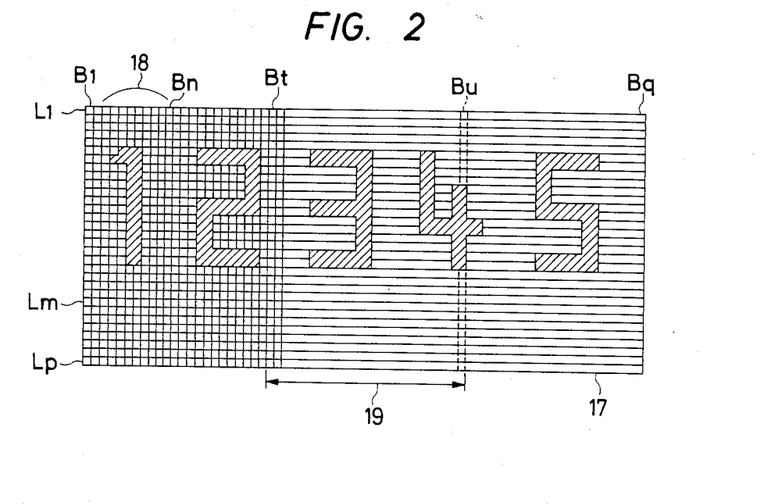
FIG. 2 and 3 show explanatory views conceptually describing the field of vision of the image sensor of the first embodiment.

Recognition processing is performed on the basis of the binary signal data stored in the memory 8. In this first embodiment, only the binary signals corresponding to characters properly located in the field of vision are subjected to the recognition processing, as shown in FIG. 2.

Figure 3:
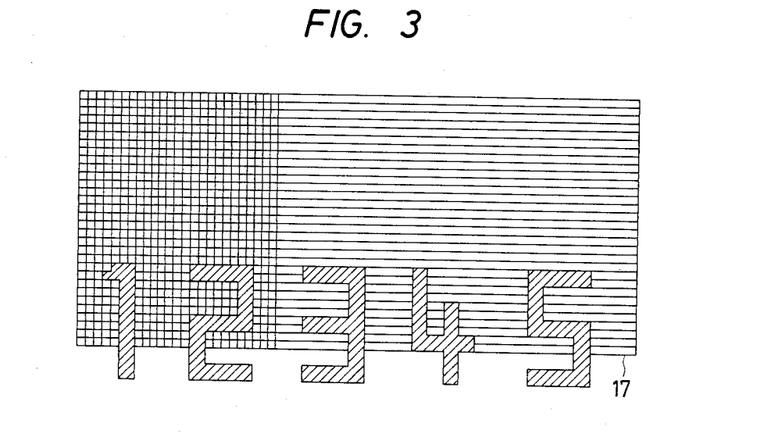

FIG. 3 depicts a scenario wherein characters partially located out of the field of vision 17 are scanned by the image sensor 6. In this case, the recognition processing herein after described in detail is not performed. The scanner may then be realigned with the line of print, scanning is again performed by the image sensor 6, and binary signals are generated and stored in the memory 8, as described above.

A scanned position detecting circuit 9 makes the determination as to whether or not the recognition processing should be performed. The circuit 9 operates simultaneously with the storage of the binary signals in the memory 8. Almost as soon as the storage is finished, the circuit 9 judges whether or not the recognition processing should be performed. If the circuit 9 did not make the judgment, the fact that no recognizable characters have been scanned would not be detected until the pattern of the binary signals is being finally recognized by a recognition processing circuit 15. In other words, the scanned position detecting circuit 9 is used to truncate the recognition process if no recognizable characters have been scanned, eliminating that waste of time that would accompany needless processing of noncognizable signals. Besides, the scanned position detecting circuit 9 further ensures that the recognition processing is performed as to not all of the field of vision, but only the character presence area thereof.

Figure 4:
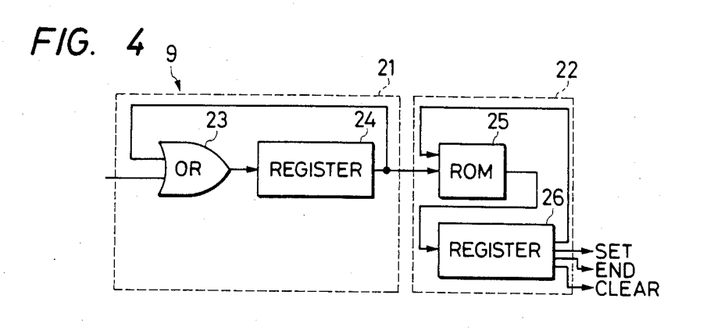
FIG. 4 shows a detailed block diagram of a scanned position detecting circuit.

FIG. 4, shows a specific example of the construction of the scanned position detecting circuit 9. The circuit 9 comprises a row OR circuit 21 consisting of an OR gate 23 and a register 24, and a judgment circuit 22 consisting of a ROM 25 and a register 26.

The row OR circuit 21 performs an OR operation on image elements in each row within approximately the central one-third (from a column Bt to another Bu as shown at 19 in FIG. 2) of the horizontal length of the field of vision 17 of the image sensor 6.

Binary signals corresponding to an image as shown in FIG. 2 are generated by the control and binary signal generation circuit 7 and are sequentially stored in the memory 8, starting with the crossing of a row L1 and a column B1 to that of a row Lp and column Bq. At the same time, the row OR circuit 21 performs an OR operation on the binary signals for each row from the column Bt to the other Bu. To be more specific, when the register 24 is already cleared and the signal for the crossing of the row L1 and the column Bt is entered into the OR gate 23, an OR operation is performed on the signal and the output signal of the register 24 so that the result of the OR operation is stored in the register. Such operations are repeatedly performed up to the column Bu so that the results of the OR operations for the row L1 are stored in the register 24. After the OR operations are performed up to the column Bu, the contents of the register 24 are sent to the judgment circuit 22, and the register 24 may be cleared. The results of the OR operations from the row L1 to the other Lp are thus sent to the judgment circuit 22. It can be found out from the results of the OR operations for each row whether or not a binary signal for black is present for the row.

The construction and operation of the judgment circuit 22, which is supplied with signals indicating the results of the OR operations, will now be described. The signals indicating the results of the OR operations for the rows are entered into the ROM 25 of the judgment circuit 22. The contents read out from the ROM 25 are stored in the register 26. Codes indicating the changes between the states of black and white are stored in the ROM 25 so that information regarding the states of black and white in the rows are stored in the register 26. A signal sent from the register 24 and indicating the result of the OR operation for the next row and a signal sent from the register 26 and indicating the preceding state are entered into the ROM 25 so that a signal indicating a new state may be stored in the register 26. Codes corresponding to signals SET, END and CLEAR are stored in the ROM 25. The signal SET is outputted when the state of white has changed into that of black. The signal END is outputted when the state of black has continued over a prescribed number (which corresponds to the height of the character) and changed into that of white. The position of each character extends from a row corresponding to the output of the signal SET to a row corresponding to the output of the signal END. When both the signals SET and END are not outputted to the lowermost row Lp, the signal CLEAR is outputted to a control circuit 16 so that the circuit clears the memory 8, not to perform recognition processing thereafter, but to ready the memory perform scanning again to take in new binary signals.

The reason why the OR operations for the rows are performed not to signals for all the columns within the field of vision 17, but only on signals for the columns within the central portion of the field of vision is that the influence of noise that is produced when the paper 3 is smaller than the field of vision or random marks on the paper outside the read characters should be reduced as much as possible. If the white background of the paper 3 is much larger than the field of vision 17, the OR operations for each row at all the columns may be performed.

A new line detection circuit 10 determines the position of each character in terms of the signals SET and END sent from the scanned position detecting circuit 9, and compares the determined position with that determined in terms of the signals SET and END sent by the next scanning. This comparison makes it possible for the detection circuit to estimate whether it is in fact a new line of print that is being scanned, by comparing the number of image elements. If it is estimated that the same line of print has been scanned, a clear signal will be sent. When it is judged that a new line of characters is present, the new line detection circuit 10 sends out a new signal to the recognition processing circuit 15.

After the new signal is sent to the circuit 15, the circuit performs recognition processing, as described herebelow. When a line of characters which is longer than the field of vision 17 is to be read, the scanner 1 only needs to be moved up or down. Since the scanner 1 is put on the paper 3 to read the characters, the same portion would be repeatedly scanned and read if the scanner 1 remained on the paper for a long time. Actually, the new line detection circuit 10 functions to prevent the same portion from being repeatedly scanned and read.

The pick-out of one character will now be described. Since the binary signals stored in the memory 8 correspond to the entire field of vision 17 of the image sensor 6, and since the numbers of vertical and horizontal image elements corresponding to the field of vision to numerous to be processed by the recognition processing circuit 15, the binary signals need to be divided into quantities of data which can be processed by the circuit 15. In other words, the binary signals need to be subdivided into discrete units which correspond to exactly one character.

In the ensuant description of the pick-out process, it is assumed that the number of horizontal (along the rows) and vertical (along the columns) image elements which can be processed by the recognition processing circuit 15 are n and m, as shown in FIG. 2. The binary signals for the n horizontal image elements and all vertical image elements (whose number is P) located within the field of vision 17 are first transferred to a one-digit buffer 11. In other words, the binary signals for the crossings of the rows L1-Lp and the columns B1-Bn are stored in the one-digit buffer 11.

A vertical position detecting circuit 12 detects the vertical position of one character as to the binary signals in the one-digit buffer 11 to reduce the number of the binary signals to a number m of vertical image elements which can be processed by the recognition processing circuit 15. The vertical position detecting circuit 12 has the same construction as the scanned position detecting circuit 9 shown in FIG. 4, and comprises a row OR circuit 21 consisting of an OR gate 23 and a register 24, and a judgment circuit 22 consisting of a ROM 25 and a register 26. The vertical position detecting circuit 12 performs an OR operation on the horizontal image elements in each row. Since the binary signals corresponding to the columns B1-Bn are stored in the one-digit buffer 11, the circuit 12 performs the OR operations for the rows L1-Lp as to the columns B1-Bn. After performing the OR operation, the circuit 12 functions in the same manner as the scanned position detecting circuit 9 shown in FIG. 4.

Figure 5:
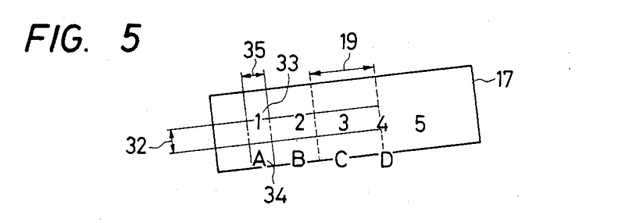
FIG. 5 shows an explanatory view conceptually describing the inclination of the field of vision to characters.

When the vertical position detecting circuit 12 determines the vertical position of one character, it is taken into consideration that a part of that character is located in the character position determined by the scanned position detecting circuit 9. This is performed for the following reason. If the field of vision 17 of the scanner 1 is inclined with respect to the characters (the allowable limit to the angle of the inclination is 8° in this embodiment) as shown in FIG. 5, it cannot be judged, in terms of only the horizontal OR operation relating to a horizontal image element 35 which of the characters ("1" and "A") 33 and 34 is in a proper position. This is because the character in 33 is at least partially located in position 32 as well. However, the circuit will treat the position of a character that is completely scanned by the scanned position detecting circuit 9 as the proper position such as the character "3" in FIG. 5.

The vertical position of the character is determined by the vertical position detecting circuit 12 to determine the number m of image elements which can be processed by the recognition processing circuit 15. At that time, the number m of image elements is determined in such a manner that the position of the character is nearly in the center of the image elements. The number m of the vertical image elements is thus determined in terms of the binary signals stored in the one-digit buffer 11, so that data $m \times n$ on one character are transferred to a one-character buffer 14. In the example shown in FIG. 2, the binary signals for an area defined by the rows L1-Lm and the columns B1-Bn are transferred as the one-character data to the one-character buffer 14.

When the next binary signal is to be stored in the one-digit buffer 11, a horizontal position detecting circuit 13 determines the horizontal position of the stored binary signal. At that time, a horizontal shift may be performed for every image element to store the binary signal in the one-digit buffer 11. In that case, however, the binary signals of an identical character would be likely to be repeatedly stored so as to take a long processing time. For that reason, the horizontal position detecting circuit 13 detects the number of image elements for the next character to perform a horizontal shift by the detected number to store the binary signals of horizontal and vertical image elements having dimensions n and p in the one-digit buffer 11. This operation will now be described in detail with reference to FIGS. 6(a), 6(b), and 6(c).

Figure 6A:
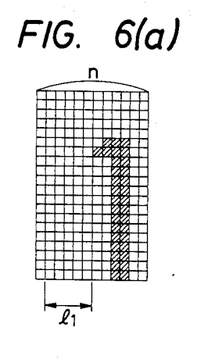
FIG. 6a–6c show an explanatory view describing the operation of a horizontal position detecting circuit.
Figures 6A, 6B, 6C:
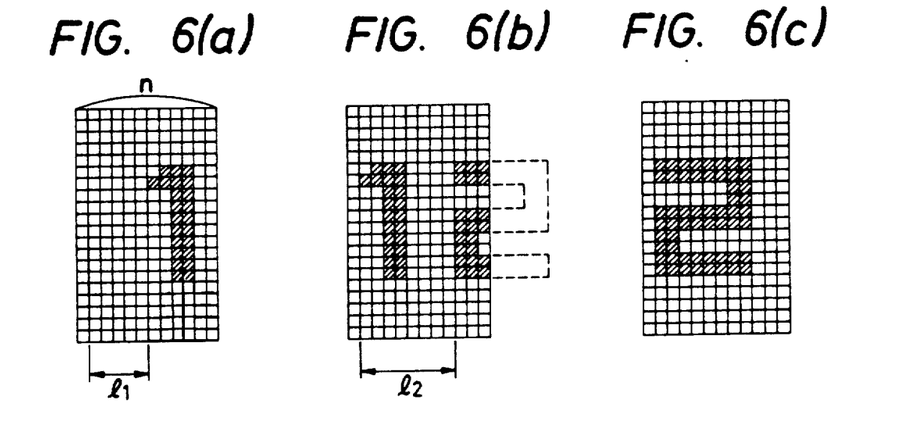
Figure 6B:
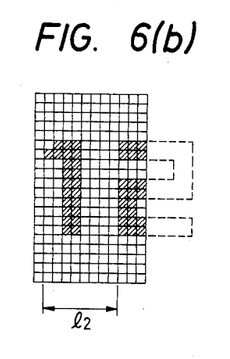
Figure 6C:
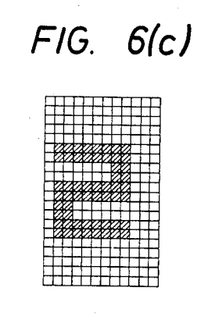

As shown in FIG. 6(a), the number l1 IMAGE elements to the left-hand side of the position of a character is first detected to set a horizontal character pick-out position for the recognition processing circuit 15. At that time, a signal SLN indicating the detected number l1 is sent from the horizontal position detecting circuit 13 to a control circuit 16. As a result the control circuit 16 functions so that an image region is shifted by the number l1 on the basis of the signal SLN, and the binary signals of horizontal image elements of a number n for one character are then taken out and stored in the one-digit buffer 11. This results in producing a state shown in FIG. 6(b). Subsequently, the number l2 of image elements to a neighboring character shown in FIG. 6(b) is detected so that a signal SLN indicating the detected number l2 is sent from the horizontal position detecting circuit 13 to the control circuit 16. As a result, the control circuit 16 functions so that the image region is shifted and the binary signals for one character are then stored in the one-digit buffer 11. The number of the image elements for the neighboring character is thus detected to collectively shift the image region of the image elements to quicken the separation of the binary signals for one character to shorten the time of processing.

Figure 7:
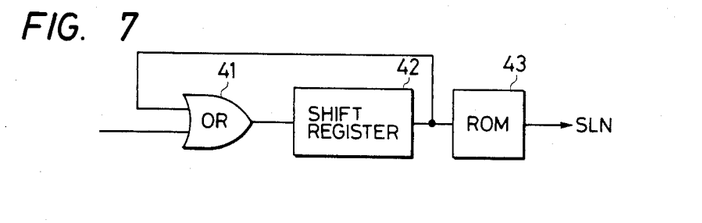
FIG. 7 shows a detailed block diagram of the horizontal position detecting circuit.

FIG. 7 shows the construction of the horizontal position detecting circuit 13, which comprises an OR gate 41, a shift register 42 and a ROM 43. The binary signals for the crossings of the rows and the columns are sequentially inputted to the OR gate 41 from the one digit buffer 11. An OR operation on each input binary signal to the OR gate 41 and the output of the shift register 42 having in steps corresponding to n columns across one row is performed by the OR gate so that the result of the OR operation is stored in the shift register. The vertical OR operations for all the rows across the columns are thus performed to detect a column in which the first image element of a character is located.

The results of the OR operations performed by OR gate 41 are entered into the ROM 43, which is used for controlling. Control signals indicating image element numbers 11, 12 and so forth are read from the ROM 43. The ROM 43 also functions to detect and remove optical noise made by something smaller than a character. At that time, a collection with a pattern stored in the ROM 43 is performed to judge whether a signal is noise or not. When the signal is judged to be noise, a signal SLN is not sent out, but a shaft is automatically performed by a number n of horizontal image elements.

Since the beginning of each character in the horizontal direction of the image region can be detected in terms of image element numbers as described above, the image region can be collectively shifted to the position of the character.

The recognition processing circuit 15 functions to recognize one character from the binary data stored in the one-character buffer 14. The circuit 15 may be a conventional one, such as that disclosed in the Japanese Patent Publication No. 6418/84. The circuit 15 extracts characteristic data on the constituent portions of the character in each of the rows or columns within the horizontal and vertical ranges of the character, so that character recognition processing results which correspond to the type of the characteristic data and the sequence of their appearance are sent out from the circuit 15.

Although the one-digit buffer 11 is provided for a number of horizontal image elements equal to the number of image elements which can br processed for one character, the buffer 11 may further be provided for a number of vertical image elements equal to that of the image elements which can be processed for one character.

If a line of characters which require a larger number of digits than the field of vision of the image sensor 6 can view, the scanner 1 may be horizontally shifted to perform the scanning function in increments.

Although the horizontal OR operations are performed as to the central portion of the field of vision to perform detection by the scanned position detecting circuit, the detection may be performed as to not only the central portion but also the right and left portions or a plurality of portions.

Figure 8:
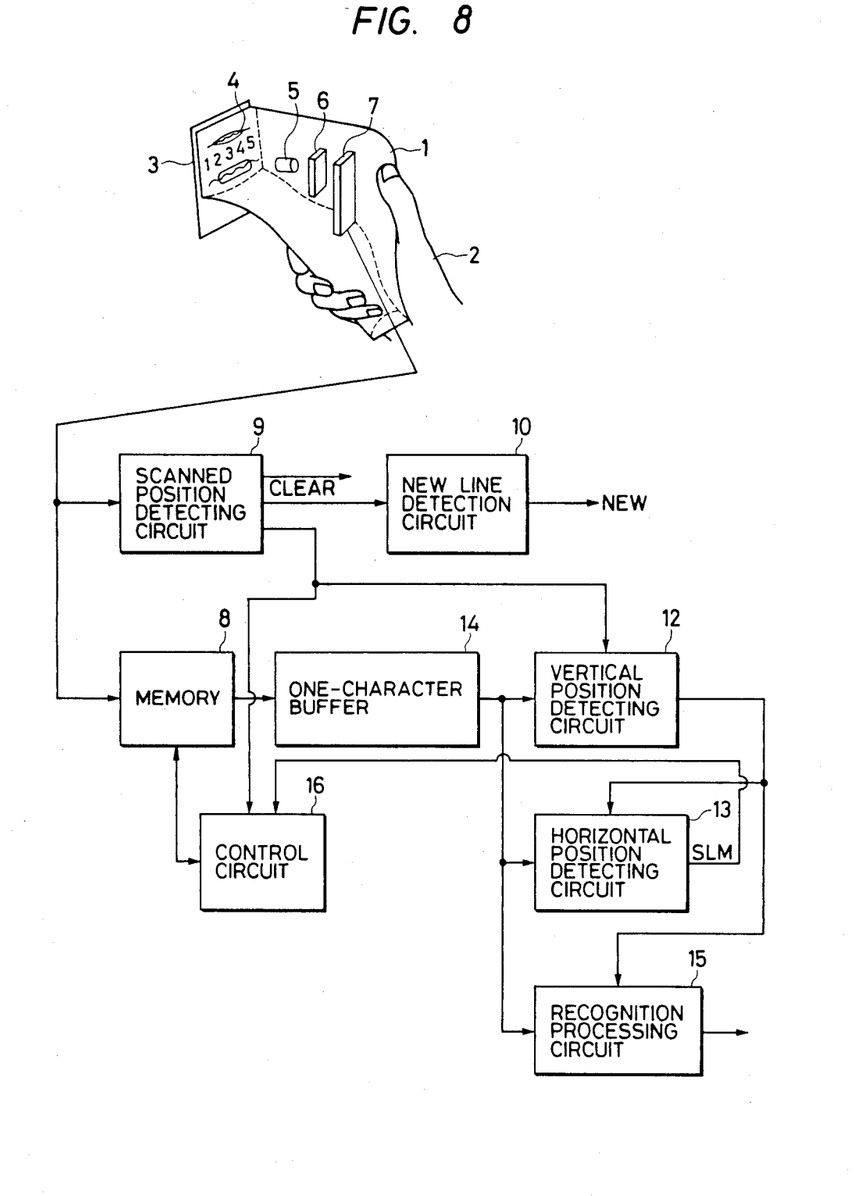
FIG. 8 shows a block diagram of a second embodiment of the present invention.

FIG. 8 shows a second embodiment of the present invention, wherein only the one-character-pick-out means differs from that of the first embodiment. The second embodiment is otherwise identical to the first embodiment in regard to FIGS. 8-10. The second embodiment is hereafter described in detail, except for those portions which are the same as the first embodiment.

Figure 9:
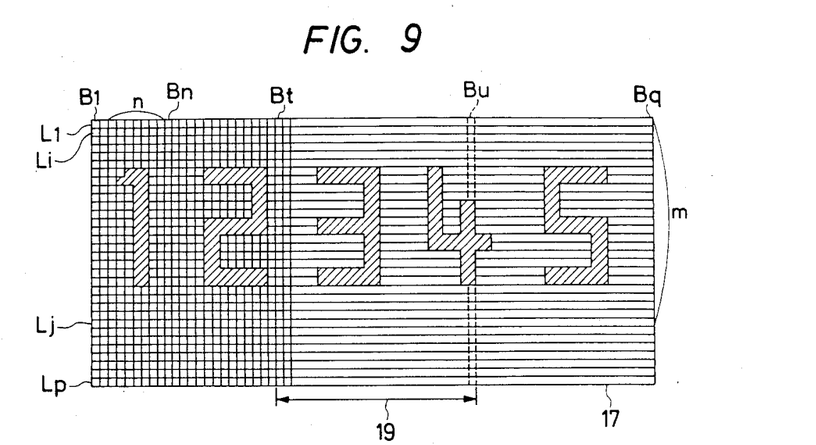
FIG. 9 shows an explanatory view conceptually describing the field of vision of the image sensor of the second embodiment.

The character pick-out function of the second embodiment is first described. Since binary signals stored in a memory 8 correspond to the entire field of vision of an images sensor 6, the data stored in the memory is of greater dimension than can be processed by the recognition processing circuit 15. For that reason, the signals need to be converted into binary signals which correspond to a quantity of data which can be processed by the circuit 15. In other words, the signals need to be converted into binary signals which correspond to a signal character. Assuming that the number of image elements which can be processed by the circuit 15 is n in the horizontal direction (along the rows) and m in the vertical direction (along the columns) as shown in FIG. 9, the binary signals corresponding to the numbers n and m are read from the memory 8 by a control circuit 16. At that time, the position of the number m of vertical image elements to be processed determined from character position signals SET and END, which are sent from a scanned position detecting circuit 9.

FIG. 10 shows a view for illustrating the termination of the position when a character position a is detected on the basis of OR operations for the central portion 19 of the field of vision 17. Image elements (m−a)/2 are added as margins upwardly and downwardly from the character position a to determine a vertical position and the number m. At that time, even if the field of vision 17 of the image sensor 6 is inclined with respect to the characters, the number m is determined so that all the characters within the field of vision are covered within the allowable limit of inclination.

Figure 11:
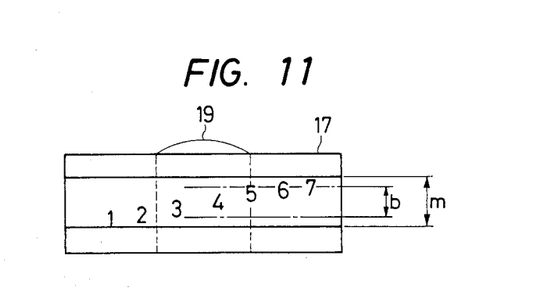

FIG. 11 shows an example of an inclined field of vision 17. It should be noted that although only a single character is contained within the central band b of the vertical field, the remainder of the characters are in the field of vision 17, and are within the larger vertical range m. For example, the number of image elements corresponding to a vertical range of 8 mm is set at a m when the horizontal length of the field of vision 17 is 60 mm and the allowable limit ot the angle of the inclination of the field of vision is +15°.

As for the horizontal range n, a number n of the binary signals from the left-hand end are first stored in a one-character buffet 14. A number n of image elements are then read from a position to which the image elements are horizontally shifted by a signal SLN sent from a horizontal position detecting circuit 13.

FIG. 9 shows the position of the image elements of the number n from the column B1, which is the first left-hand end in the vertical range m, to the column Bn. As shown in FIG. 9, the vertical range m set by the binary signals in the one-character buffer 14 is made larger than the height of each character, because a margin is provided for the range. The vertical position of one character in the one-character buffer 14 is then detected by a vertical position detecting circuit 12.

The vertical position detecting circuit 12 has the same construction as the scanned position detecting circuit 9 shown in FIG. 4 for the first embodiment, and comprises a row OR circuit 21 consisting of an OR gate 23 and a register 24, and a judgment circuit 22 consisting of a ROM 25 and a register 26. The circuit 12 performs an OR operation on horizontal image elements in each row. Simultaneously, the OR operation is performed for each of rows Li-Lj from the column B1 to the other Bn because the binary signals for the vertical range from the row Li to the other row Lj and for the horizontal range from the column B1 to the other Bn are previously stored in the one-character buffer 14. The vertical position detecting circuit 12 thereafter functions in the same manner as the scanned position detecting circuit 9 shown in FIG. 4.

When the vertical position detecting circuit 12 determines the vertical position of one character, it is considered that a part of the character is located in a character position determined by the scanned position detecting circuit 9.

When the next binary signal is stored in the one-character buffer 14, the horizontal position of the binary signal is determined by the horizontal position detecting circuit 13. At that time, a horizontal shift may be performed for image elements one by one to store the binary signal in the one-character buffer 14. In that case, however, the binary signals of an identical character would be likely to be repeatedly stored in the buffer 14 so as to take a long processing time. For that reason, the horizontal position detecting circuit 13 detects the number of image elements to the next character to send a signal SLN to the control circuit 16 to perform a horizontal shift by the detected number to store the binary signals of horizontal and vertical image elements of numbers n and p in the one-character buffer 14. In other words, the constitution of the horizontal position detecting circuit 13 of the second embodiment is the same as that of the circuit 13 of the first embodiment.

The second embodiment is described in detail with reference to FIGS. 6(a), 6(b) and 6(c). As shown in FIG. 6(a), the number l1 of image elements to the left-hand end of the position of a character is first detected to set a horizontal character cut-out position for the recognition processing circuit 15. At that time, a signal SLN indicating the detected number l is sent from the horizontal position detecting circuit 13 to the control circuit 16. The control circuit 16 then functions so that the image region is shifted by the number L1 of image elements on the basis of the signal SLN, and the binary signals of the horizontal image elements whose number is n corresponding to one character are then taken out and stored in the one-character buffer 14. This results in producing a state shown in FIG. 6(b). Subsequently, the number 2 of image elements to the neighboring character shown in FIG. 6(b) is detected so that a signal SLN indicating the detected number P2 is sent from the horizontal position detecting circuit 13 to the control circuit 16. As a result, the control circuit 16 functions so that the binary signals of one character are stored in the one-character buffer 14 as the image region is shifted, as shown in FIG. 6(c). The number of image elements to the neighboring character is thus detected to collectively shift the image region by the detected number to quicken the takeout of the binary signal of one character to shorten the time of processing.

While the invention has been described in connection with what is presently considered to be the most practical and preferred embodiment, it is to understood that the invention is not limited to the disclosed embodiment, but, on the contrary, is intended to cover various modifications and equivalent arrangements included within the spirit and scope of the appended claims.

What is claimed is:

1. An optical character reading comprising:
    a hand-held image sensing means for simultaneously scanning a plurality of characters on a line of print and producing analog signals in response thereto that correspond to image elements sensed;
    binary signal generating means for generating binary data responsive to said analog signals which are received from said image sensing means;
    scanned position detecting means for determining whether the characters scanned were completely within the field of vision of said scanning means, said scanned position detecting means including means for truncating the binary data if said scanned position detecting means determines that some of the characters are not fully within the field of vision of the sensing means so that further processing of the truncated binary data does not occur and processing speed is increased;
    memory means for storing said binary data;
    one character pick out means for separating binary data from said memory means corresponding to n individual characters; and
    recognition processing means for identifying the individual character separated by said pick out means, whereby an entire printed line of characters, N being a predetermined number of individual characters, may be scanned and identified without having to move the scanner from one character to another.

2. An optical character reader according to claim 1, wherein said hand-held image sensing means includes a plurality of photoelectric conversion elements.

3. An optical character reader according to claim 1, wherein said pick out means further comprises a buffer memory for storing said binary data corresponding to an individual character.

4. A method of mechanically scanning and recognizing printed characters comprising:
    (a) scanning a plurality of individual characters simultaneously with a hand-held analog sensing device;
    (b) converting the analog signal outputted from the sensing device into binary data;
    (c) determining whether the characters scanned were completely within the range of vision of said hand-held analog sensing device;
    (d) truncating the binary data if the characters scanned were not completely within the field of vision of said hand-held analog sensing device so that further processing of the truncated binary data does not occur and processing speed is increased;
    (e) separating the binary data corresponding and to a single character from the remainder of said data if the characters scanned in were completely within the field of vision of said hand-held analog sensing device;
    (f) processing the binary data for said single character to identify the character.

5. A method of mechanically scanning and recognizing printed characters according to claim 4, further comprising the step of storing said binary data from step (b) in a memory means prior to performing step (e).

* * * * *

UNITED STATES PATENT AND TRADEMARK OFFICE
CERTIFICATE OF CORRECTION

PATENT NO. : 4,797,940

DATED : Jan. 10, 1989

INVENTOR(S) : Koji SATO; Masahiro KURAKAKE; Kazuo FUJIWAKI.

It is certified that error appears in the above-identified patent and that said Letters Patent is hereby corrected as shown below:

IN THE FIGURES:

FIG. 6(a) the numeral "1" is incorrectly hatched to the bottom of the field.

Please change to show the numeral 1 centered and to the right of the field as illustrated on the attached drawing.

Signed and Sealed this

Fifth Day of September, 1989

Attest:

DONALD J. QUIGG

Attesting Officer

Commissioner of Patents and Trademarks